United States Patent [19]

Monkewitz et al.

[11] Patent Number: 4,942,775

[45] Date of Patent: Jul. 24, 1990

[54] METHOD OF AND DEVICE FOR ACCELERATING TEST PIECES ON A CIRCULAR PATH

[75] Inventors: Martin Monkewitz, Lucerne; Erich Oppliger, Heimberg, both of Switzerland

[73] Assignee: Schweizerische Eidgenossenschaft, Emmen, Switzerland

[21] Appl. No.: 348,608

[22] Filed: May 8, 1989

[51] Int. Cl.⁵ .............................................. G01N 3/00
[52] U.S. Cl. ................................................... 73/865.3
[58] Field of Search ................ 73/865.3, 865.6, 865.8, 73/865.9, 866, 1 D, 1 DC, 1 E

[56] References Cited

U.S. PATENT DOCUMENTS 3,311,251  7/1967  Tibbetts ............................. 73/865.3

FOREIGN PATENT DOCUMENTS 0913097  3/1982  U.S.S.R. ............................. 73/865.3
0989344  1/1983  U.S.S.R. ............................. 73/865.3

Primary Examiner—Robert Raevis
Attorney, Agent, or Firm—Allegretti & Witcoff, Ltd.

[57] ABSTRACT

The method according to the invention makes it possible rapidly to accelerate a test piece in a start-up phase in accordance with a stipulated acceleration program, and subsequently to maintain the test piece at constant acceleration during an arbitrary time. The testing device for carrying out the method consists of a rotor carrying the test piece. The rotor is accelerated by a pressure medium in its start-up phase and is driven in its stationary phase by an electromotor via a toothed belt. In the start-up phase, the test piece experiences a continuous rotation from the tangential direction of the circular path (K) into the radial direction by the angle of rotation $\psi$ of 90°.

A preferred use of the device resides in testing rocket nose cones. This replaces real launching and/or expensive linear accelerators.

14 Claims, 5 Drawing Sheets

METHOD OF AND DEVICE FOR ACCELERATING TEST PIECES ON A CIRCULAR PATH

BACKGROUND OF THE INVENTION

The present invention relates to a method for the controlled build-up of a stipulated acceleration at a test piece on a circular path, the direction of acceleration being held constant at least during the start-up phase with respect to the test piece, and relates in addition to a device for carrying out the method.

In order to enhance system reliability and to gain further technical knowledge, a multiplicity of apparatuses, instruments and installations are today subject to acceleration testing before they are used, or, again, objects are selected from mass production in accordance with statistical considerations and subjected to a trial operation leading to destruction.

In this connection, the problem often arises of achieving high impulsive increases in acceleration, and subsequently maintaining a stationary operation at constant acceleration over a long period. To this end, linear accelerators have been developed, which mostly have large space requirements and need high capital expenditure.

It is therefore an object of the invention to remove these disadvantages by testing on a circular path, and to create a method which allows test pieces to be accelerated constantly and/or impulsively, and subsequently to be exposed for an arbitrary length of time to stationary operation at constant or slightly changing acceleration. Physical measurements of a test piece are to be possible, along with its operation, under stipulated conditions during the entire course of preselected test programs.

Another object of the present invention is to provide a device produced economically and also operated for special tasks, such as impact trials.

These objects and other objects and advantages are achieved according to the invention in that in the region of its center of acceleration the test piece is rotated by at least 90 degrees perpendicular to the tangential direction of its circular path, and that at the beginning of the start-up phase of the rotary motion in the circular path the test piece is aligned in its longitudinal axis tangential to the circular path, and in that during the start-up phase. the test piece is rotated with its longitudinal axis towards the center point of the circular path, and in that after a stipulated angle of rotation ($\phi$) this test piece is aligned on the circular path with its longitudinal axis radially towards the center point of the circular path and experiences a stationary rotational phase in this position.

For most test pieces tested in accord with the principles of this invention, the center of acceleration employed for each test piece is identical to its center of mass. Seen in general terms, however, this is the point at which the stipulated acceleration vector is to act, or through which said vector is to act during the test process.

The teaching of this invention may be applied to acceleration cycles which are arbitrary per se. the angle of rotation of the test piece being calculable in each case on the basis of the form of acceleration. By contrast with methods employing linear accelerators, the circular path makes it possible to realize stationary or constant acceleration values at the test piece which last for an arbitrary length of time. Once a body has been accelerated to a definite value, it can, if desired, be braked in analogous fashion, so that test programs which are close to reality can be realized given suitable design of an installation.

The method may be practiced wherein the acceleration of the test piece takes place in a rectangular fashion with respect to its center and after an angle of 45° the test piece is aligned on the longitudinal axis radially towards the center point of the circular path. This method yields optimal kinetic relationships at the test piece.

The mathematical relationships, which are advantageous for rotating the test piece are important and are considered more specifically hereafter.

The rotor of the testing device, which guides the test piece in a circular path is provided with an impulsive drive in the start-up phase of the testing device. In one preferred embodiment a pneumatic mechanical drive is used.

By incorporating a rocker in the testing device, there is a reduction in the angle of rotation of the rotor, and thus a corresponding enhancement of the increase in acceleration at the test piece.

The rotor has a working connection to an electric motor, which is intended to accept the rotary motion of the start-up phase. This makes it possible to extend the stationary operation for an arbitrary length of time. It is possible to apply pneumatic or hydraulic media, which take effect via compression pistons and rods or levers.

A toothed belt is preferably interposed between the electric motor and the rotor. This makes a reduction possible in the simplest way, and thus an adjustment of the speed of rotation of the rotor.

The controlling curve or guide for rotating the test piece preferably extends over at least one third of the radius of the circular path.

The testing devices of the present invention can be advantageously used to test mechanical electric and electromechanical components and items of electronic equipment. The testing device has proved itself especially for testing rocket nose cones which can be tested without danger together with their control electronics and ignition chain, including warhead.

BRIEF DESCRIPTION OF THE DRAWING

Illustrative embodiments of the subject of the invention are described in more detail below on the basis of the drawing. Identical parts are provided with the same reference symbols in all views of the drawing wherein.

DETAILED DESCRIPTION OF THE PRESENT INVENTION

Figure 1:
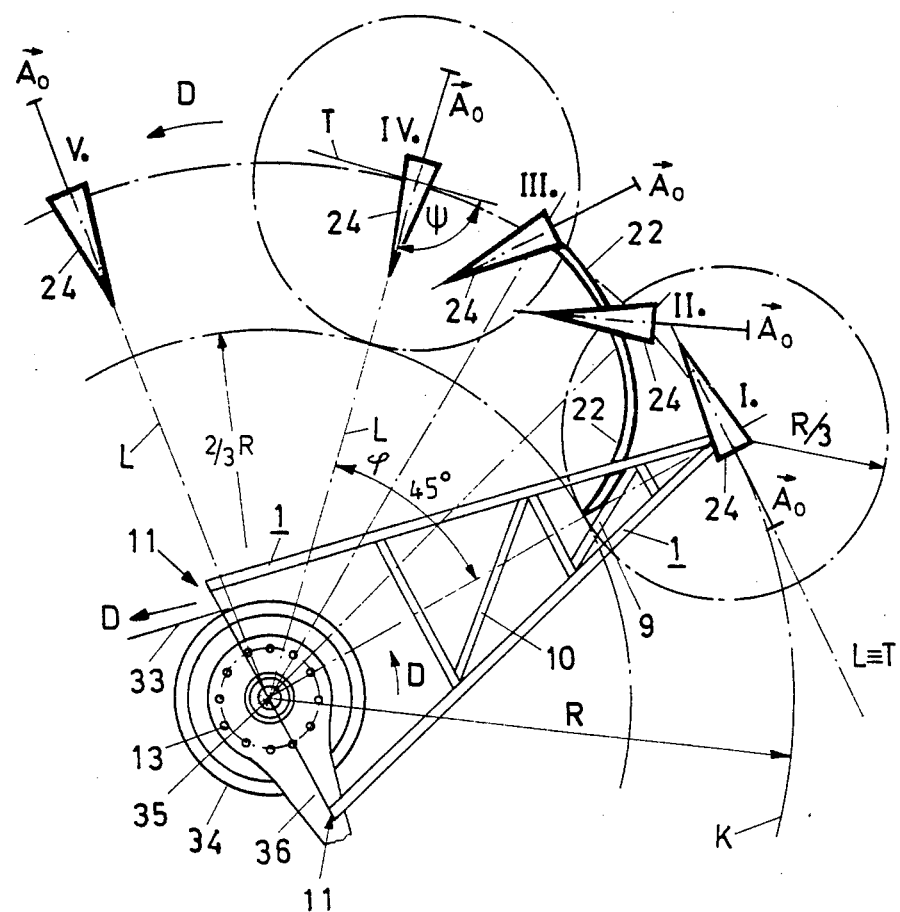
FIG. 1 shows a schematic representation of a testing device with the swivelably arranged test piece.

According to FIG. 1, a rotor—represented in simplified form—is designated by 1. The rotor is provided with stiffeners 9 and 10, and carries on its peripheral end or tip a test piece 24, which in its start position I. is aligned perpendicular to the radius R of the rotor 1, and is rotatably mounted at its center of acceleration. If, now, the test piece 24 experiences an acceleration $A_0$ (=desired acceleration) occurring suddenly through rotation of the rotor 1, (see FIG. 6), then this test piece 24 is subjected to a rapidly growing component of the resultant centripetal acceleration acting at the center of acceleration, i.e., at the center of mass of the test piece 24. In order to hold constant the value of the acceleration vector $A_0$ acting at the test piece 24 in its normal direction of acceleration e.g. longitudinal axis L, the test piece 24 is rotated in accordance with the positions II. III. IV. in such a way that the direction of acceleration always points in the direction of the test piece axis. To this end, the rotation is controlled at correspondingly diminishing angular acceleration via a controlling curve or guide 22. This start-up phase is independent of the level of the acceleration $A_0$ and always extends over a polar angle $\Phi = 45° = \pi/4$. At the end of the start-up phase, position IV. and then also in phase V., the acceleration being constant, the test piece 24 remains oriented in the radial direction and, for example, mechanically fixed in the stationary operation of the rotor 1.

The rotor 1 is fixed with two bolts 11 on a support 12 (FIG. 2) mounted on a main shaft 35. The support 12 is detachably connected to a cam disk 36 of lever-like design via drive screws 13. The cam disk 36, for its part, is connected to a toothed disk 34 (see also FIG. 3), on which there lies in a form-fitting fashion a toothed belt 33 moved in the direction of rotation D. The rotation of the test piece 24 by the required 90° takes place continuously by means of a controlling curve 22. A drag lever 24' is guided by this controlling curve 22 with the aid of a sliding shoe 22' (See FIG. 4 and FIG. 5). The drag lever 24' is connected at one end to test piece 24 and at the other end to sliding shoe 22', as will be explained more fully later.

The test piece 24 is latched in, and thus fixed, in its position in the radial direction to the circular path. The controlling curve 22 is effective over R/3, i.e one third of the radius R of the circular path.

For a rotation of the rotor 1 by the angle $\Phi$ as a function of time. the fundamentals of the system arise from the following mathematical relationships:

$$A_t = R \times \dot{\omega} \tag{1}$$

$$A_r = R \times \omega^2 \tag{2}$$

$$\vec{A} = A_0 = R \cdot \sqrt{\omega^4 + \dot{\omega}^2}, \tag{3}$$

where:
$\vec{A}$ = acceleration vector acting at the mass center of the test piece
$A$ = value of $\vec{A}$
$A_t$ = tangential component of $\vec{A}$
$A_r$ = radial component of $\vec{A}$
$\omega$ = angular velocity of the test piece on the circular path = "centrifuge speed"
$\dot{\omega}$ = angular acceleration of the test piece = "centrifuge acceleration" With the incorporation of the initial conditions, it follows from this that:

$$\dot{\omega} = \pm \sqrt{(A_0/R)^2 - \omega^4}$$

Which may be transformed into
$$\dot{\omega} = (A_0/R) \cos 2\Phi$$

The rotation of the test piece can now be determined as follows:

$$\psi = \arctan\left(\frac{A_r}{A_t}\right) = \arctan\left(\frac{R A_0 \sin 2\Phi}{R A_0 \cos 2\Phi}\right) = 2\Phi$$

This means that the entire start-up phase of the testing device is concluded after a rotation of the rotor 1 to 45°. In this phase, the test piece 24 was rotated by 90°, i.e. from the tangential direction into the radial direction of the circular path K.

Figure 2:
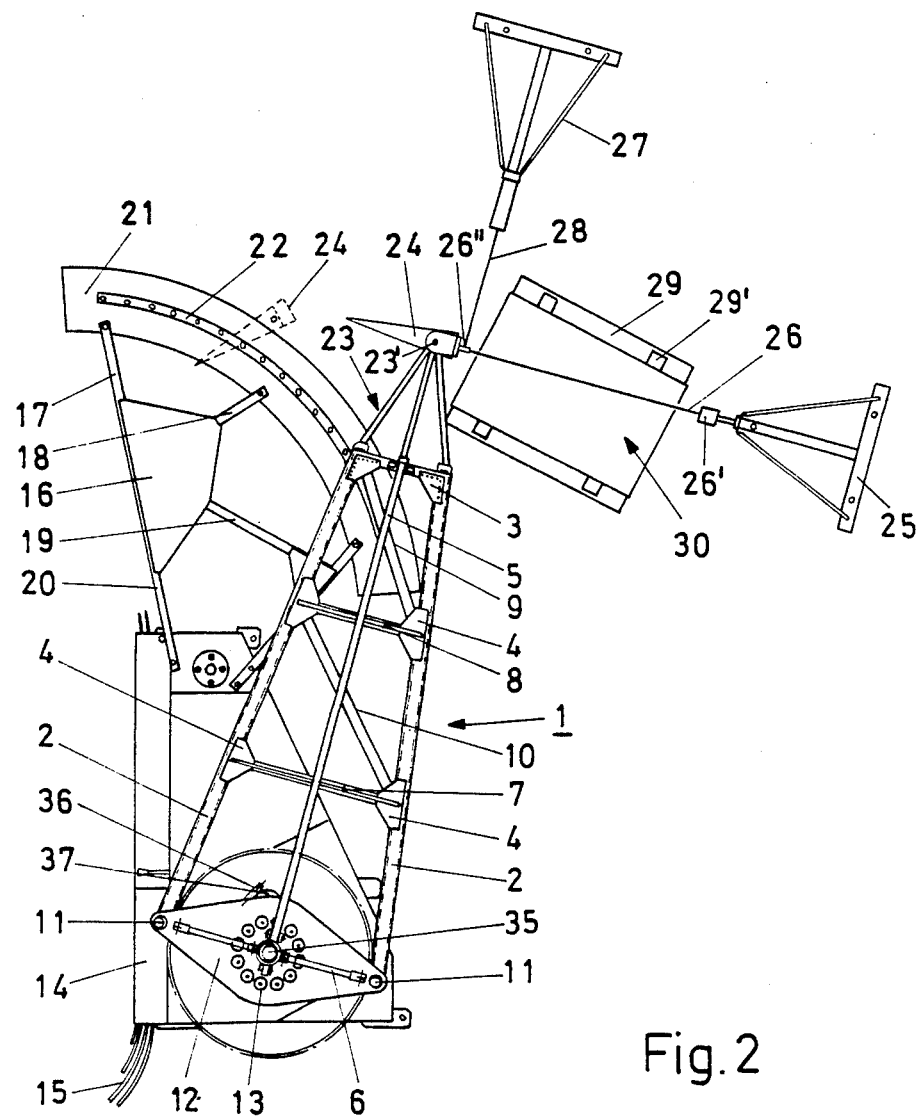
FIG. 2 shows the device according to FIG. 1 in a more detailed representation.

The testing device represented in FIG. 2 serves as a realistic simulation of guided missile launches. Visible here once again is the rotor 1 known from FIG. 1, which consists of a carrier frame 2 having junction plates 3, 4 with stiffeners 9, 10 and a longitudinal member 5 with transverse members 6, 7 and 8. The rotor 1 is fixed by means of two bolts 11 on its base side on the support 12. Likewise visible are drive screws 13, which connect the support 12 to the underlying cam disk 36.

A machine frame 14 contains the drive unit. All necessary control and supply connections 15 lead to the latter. A carrier segment 21 is screwed to the machine frame 14 via a carrier plate 16 with members 17, 18, 19 and 20. On its upper side, this carrier segment 21 has a controlling curve 22, and serves to rotate the test piece 24. Visible at the end of the rotor 1 is a specimen holder 23, which is constructed of easily shearable aluminum, and mounts the test piece 24 swivelably in a joint 23'. Fixed at the specimen holder 23 are a traction cable 26 and a release cable 28, which lead, in turn, to cable anchorages 25 and 27. The traction cable 26 is guided through the detonation chamber 30, the bore, of a protecting tube 29 with amoring 29'.

The machine frame 14 and the carrier plate 16 are fixed and supported on the floor of a so-called blast bunker.

Figure 3:
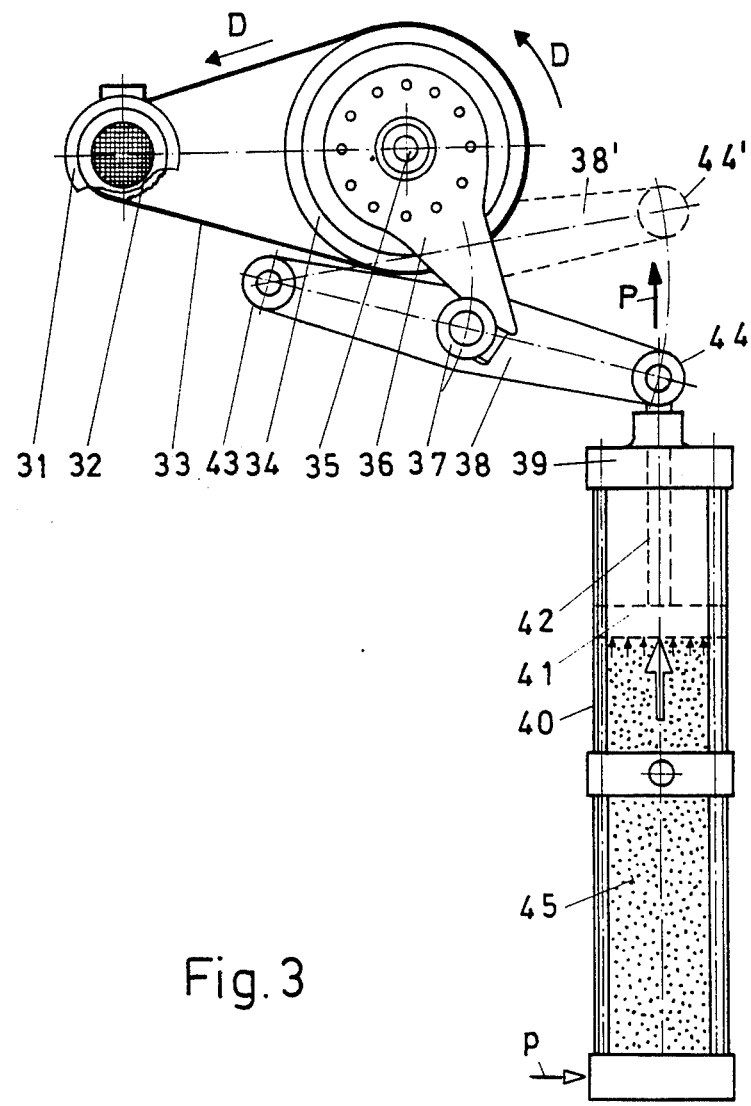
FIG. 3 shows further details of the drive of the testing device.

Visible in more detail in FIG. 3 is the drive of the rotor 1. Centered on the main shaft 35 (FIG. 1), is the cam disk 36, as is a toothed disk 34, which has a working connection to a toothed belt 33, with a further toothed disk 32 of an electromotor 31. In one embodiment, the toothed disk 32 has 36 teeth, and the toothed disk 34 has 144 of them, which yields a transmission ratio of approximately 1:4. In its recess on the lever side, the cam disk 36 engages with a pressure roller 37, and at the beginning of the start-up phase is accelerated in the direction of rotation D by a rocker 38 through a pneumatic cylinder 40 with its flange 39. Acting in the pneumatic cylinder 40 is an air pressure p, which is generated in the machine frame 14 in a manner known per se, and exerts pressure on a piston 41, which acts, for its part, with a force P on a second joint 44 of the rocker 38 via a piston rod 42 (position 44'). The rocker 38 has a first joint 43. The compressed medium 45 is located under the piston 41.

Figure 4:
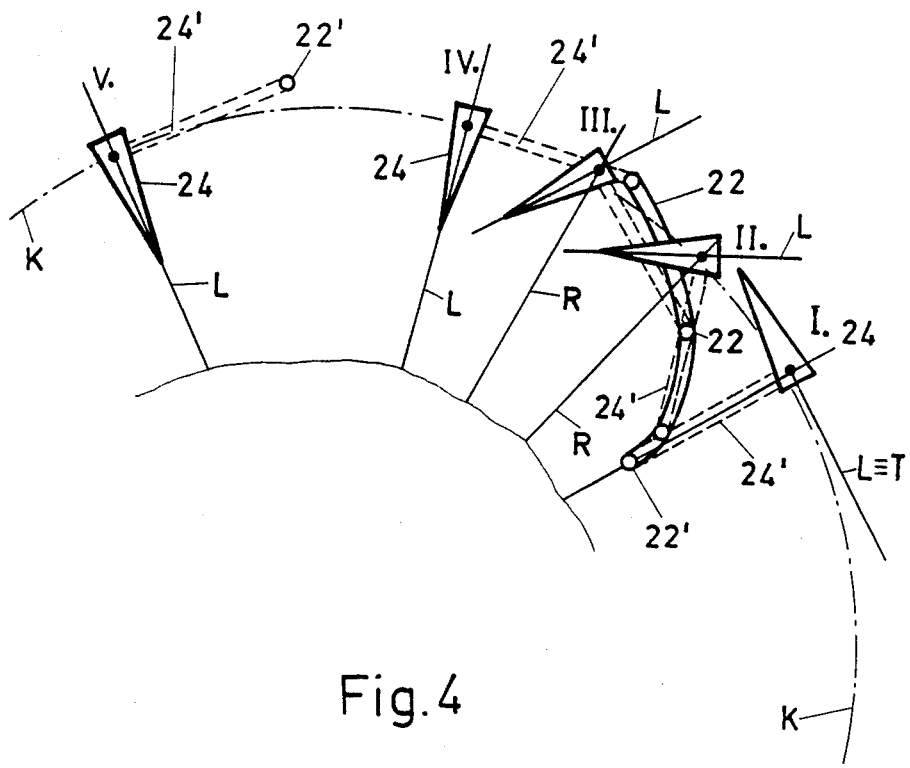
FIG. 4 shows the structural design of the rotation of the test piece by means of a drag lever.

The mode of operation of the testing device in FIG. 2 to FIG. 4 is as follows:

The test piece 24 (rocket nose cone with control electronics and warhead) is installed on the specimen holder 23 (FIG. 2), and electrically connected with all supply, control and measuring lines to an instrument and evaluation center. Once the test piece 24 signals operational readiness, in this example, the pneumatic pressure p of the medium 45 is increased until the tensile stress indicated at the measuring sensor 26' (piezo-transducer) reaches its desired value. Once this desired or predetermined value has been reached, the connecting bolts are withdrawn from a cable coupling 26'' by the release cable 28, using an electromagnet in a manner known per se. The force P suddenly rotates the rocker 38 in its second joint 44, and causes a quasi. impulsive acceleration of the rotor 1 and thus of the test piece 24 on its circular path K (FIG. 4). Simultaneously with the operation of the electromagnet which controls the cable coupling 26'', the electric motor 31 (conventional servomotor with low inertia and high break-away torque) is started, so that it holds stationary the quasi-impulsively achieved speed of rotation of the rotor 1.

With the start of the acceleration $A_O$ the test piece 24 is rotated steadily with its nose cone towards the center of rotation of the testing device, i e. the axis of the main shaft 35 (FIG. 1). by the drag lever 24' (FIG. 4), which is guided at the controlling curve 22 with the aid of the sliding shoe 22'. With the geometry of FIG. 1, the result for the controlling curve 22 is an epicycloid, that curve which is described by a fixed point of the rolling circle having the radius R/3 and centered in the test piece 24.

The previously described testing device is produced as a light-weight construction, and weighs 500 kg with the hydraulic auxiliary apparatuses. It allows test pieces having masses of up to 6.0 kg to be accelerated at 300 m/s$^2$. The increase in acceleration amounts to 15 g/40 ms on a rotor radius of 2.5 m; in the stationary, specific test operation, the rotor has a speed of 75 rev/min. and can be preselected arbitrarily between 0 to 300 rev/min. For a pneumatic pressure of 5 bar, the thrust energy at the pneumatic cylinder 40 amounts to approximately 3000 j. The electromotor has a shaft power of 4.5 kw.

FIG. 4 shows the structural design of the rotation of the test piece 24 about its center. A drag lever 24' (see also detail in FIG. 5) is rigidly connected to the test piece 24 in such a way that it always encloses a right angle with the axis L of the latter. Its other end is mechanically connected via a pivot bolt 22'' with a sliding shoe 22'. The sliding shoe 22' is guided along the controlling curve 22. In this way, the test piece 24 rotates from its start position I, i.e.. where the axis L forms a tangent T to the circular path K. At the end (position IV) of the start-up phase, the axis L encloses a right angle with the tangent T.

Figure 5:
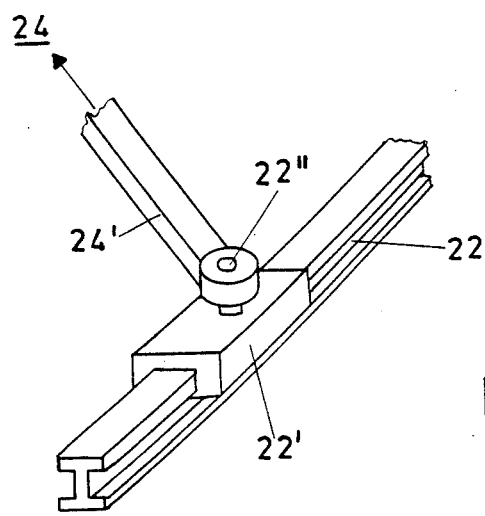
FIG. 5 shows a detailed representation of the guiding of the drag lever.

The detail according to FIG. 5 shows a part of the controlling curve 22, which is constructed in this example as a rail. The drag lever 24', which is rigidly connected to the test piece 24, can rotate about the pivot bolt 22'' of the sliding shoe 22', because the angle between the drag lever 24' and the tangent of the controlling curve 22 is variable.

Figure 6:
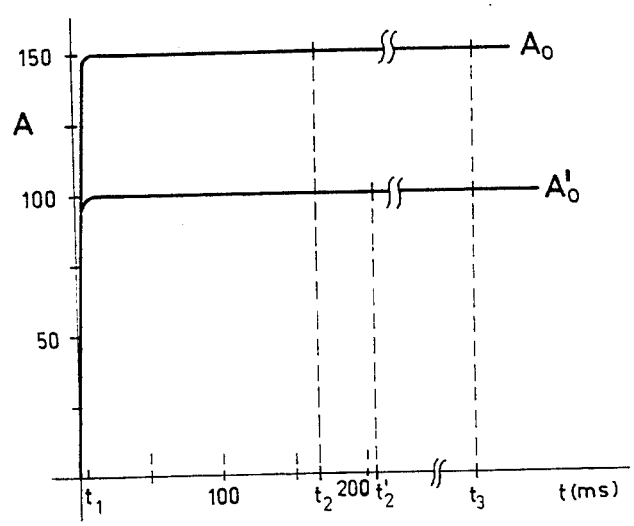
FIG. 6 shows a characteristic course of acceleration measured at the test piece.

The acceleration values measured with this installation can be seen from FIG. 6, an acceleration.time diagram, and correspond to a test program for rocket nose cones which could previously be fulfilled only with real launches. In addition, the military warhead can be tested, along with its ignition chain, in a baffle plate installed in the protecting tube 29, in its detonation chamber 30 (FIG. 2). Two curves for the acceleration A as a function of time t are represented in the diagram according to this FIG. 6. The curve $A_0$ corresponds to a acceleration of 50 m/s$^2$ the second curve $A'_0$ to a acceleration of 100 m/s$^2$. It is clear from the representation that the rise time $t_1$ of the acceleration amoun 5 ms. The conclusion of the 45° start-up phase takes place for the acceleration of 150 m/s$^2$ at $t_2$=168 ms, and for the acceleration of 100 m/s$^2$ at $t'_2$=206 ms. $t_3$ designates an arbitrary instant in the pure centrifuge movement.

The rotor 1 may be stopped at the end of its rotary motion by mechanical means. Retardation of the rotor 1 at the end of the acceleration phase occurs by the shearing of the specimen holder 23. Also, the electromotor 31 can be employed to stop the rotor 1 smoothly, by retarding the acceleration.

The subject of the invention is not, of course, limited to the illustrative embodiment described., it is possible, for example, by suitable shaping of the controlling curve 22 to realize within wide boundaries arbitrary acceleration and delay characteristics for test pieces of the most varied masses and dimensional relationships.

By including fiber.reinforced plastics as structural materials, it is also possible to achieve substantially higher final accelerations. Likewise, by routing the electrical connections via slip rings or sliding contacts or like transmission elements, the rotor 1 may rotate more than 360° and stationary endurance tests and/or varying acceleration programs can be run. On grounds of kinetics, it is advisable in such cases to provide a counterrotor and/or counterweights to the rotor and test piece mass.

The subject of the invention serves for testing civil and military objects, and can also be used for process engineering and biological tests. By comparison with linear accelerators of the same or similar performance, it is distinguished by its high economic efficiency both in assembly and in operation.

While a presently preferred embodiment of the invention has been shown and described, it will be apparent that changes and modifications may be made therein without departing from the invention. Therefore, it is intended in the appended claims to cover all such changes and modifications as fall within the true spirit and scope of the invention.

We claim:

1. A method for the controlled build-up of a stipulated acceleration of a test piece on a circular path, the direction of acceleration being constant at least during the start-up phase with respect to the test piece, wherein in the region of its center of acceleration the test piece (24) is rotated by at least 90° perpendicular to the tangential direction of its circular path (K), and at the beginning of the start-up phase of the rotary motion (D) in the circular path (K) the test piece (24) is aligned in its longitudinal axis (L) tangential to the circular path (K), and during the start-up phase the test piece (24) is rotated with its longitudinal axis (L) towards the center point (35) of the circular path (K), and after a stipulated angle of rotation ($\phi$) this test piece (24) is aligned on the circular path (K) with its longitudinal axis (L) radially towards the main shaft (35) of the circular path (K) and experiences a stationary rotational phase in this position.

2. A method as claimed in claim 1, wherein the acceleration ($A_0$) of the test piece (24) takes place in a rectangular fashion with respect to its center, and after an angle of rotation ($\Phi$) of 45 degrees ($\pi/4$) the test piece (24) is aligned on the longitudinal axis (L) radially towards the center point (35) of the circular path (K).

3. A testing device for acceleration testing comprising frame means, a rotor rotatably mounted on said frame means, said rotor having a peripheral end, drive means for rotating said rotor, a test piece having a longitudinal axis, means operatively connecting said test piece to said peripheral end of said rotor said test piece being moved upon rotation of said rotor along a circular path having a center point, the longitudinal axis of said test piece being tangentially oriented with respect to the circular path at start of motion and later after a stipulated angle of rotation radially oriented towards the center point of the circular path.

4. A testing device as in claim 3, wherein said drive means includes a pneumatic system for creating a pressure to cause an impulsive force to be applied to the rotor at start up.

5. A testing device as in claim 4 including a rocker pivoted on the frame means and wherein the pneumatic system includes a compression piston connected to an end of the rocker for actuating same, said rocker being operatively connected to the rotor for actuating same.

6. A testing device as in claim 5 including a main shaft journalling the rotor, and a cam disk secured on the main shaft, said rocker engaging the cam disk for moving same.

7. A testing device as in claim 6 including a roller journalled on the rocker intermediate its ends, said roller engaging said cam disk, whereby actuation of the compression piston will pivot the rocker, causing the roller to move the cam disk and thereby rotate the main shaft to move the rotor and test piece carried thereon.

8. A testing device as in claim 4 including control means for building up a predetermined pressure in the pneumatic system and then releasing the rotor upon attainment of a predetermined pressure to . impulsively actuate the rotor.

9. A testing device as in claim 8 wherein the control means includes a connecting bolt for detachably retaining the rotor and a release cable for withdrawing the connecting bolt to release the rocker, whereby when a predetermined pressure is achieved in the pneumatic system, the release cable is actuated to withdraw the connecting bolt and permit the rotor and the test piece carried thereon to be accelerated with an impulsive acceleration.

10. A testing device as in claim 3 including a controlling curve on the frame means extending over at least one third of the radius of the ciruclar path and a drag lever connected at one end to the test piece and at the other end to the controlling curve.

11. A testing device as in claim 10 including a sliding shoe operatively connecting said other end of the drag lever to the connecting curve.

12. A testing device as in claim 11 wherein said one end of the drag lever is fixedly connected to the test piece so that it always encloses a right angle with the longitudinal axis of the test piece.

13. A testing device as in claim 3 including an electromotor on the frame means, and drive means for connecting the electromotor to the rotor, said drive means for connecting the electromotor to the rotor including a toothed belt, a toothed disk on the electromotor and a toothed disk on the main shaft, said toothed belt being trained over said toothed disks on said electromotor and main shaft.

14. A testing device as in claim 13 wherein the ratio of the teeth on the toothed disk on the electromotor with respect to the teeth on the toothed disk on the main shaft is on the order of 1:4.

* * * * *

UNITED STATES PATENT AND TRADEMARK OFFICE
CERTIFICATE OF CORRECTION

PATENT NO. : 4,942,775              Page 1 of 3

DATED : July 24, 1990

INVENTOR(S) : Monkewitz, et al.

It is certified that error appears in the above-identified patent and that said Letters Patent is hereby corrected as shown below:

Column 3, line 61, the phrase "'centrifuge speed'" should read --'centrifugal speed'--

Column 3, line 62-63, the word "'centrifuge" should read --'centrifugal--

Column 1, line 61, the phrase "per se." should read --per se,--

Column 2, line 38, the phrase "mechanical electric and" should read --mechanical, electric and--

Column 3, line 11, the phrase "accleration e.g." should read --acceleration, e.g.--

Column 3, line 20, the phrase "position IV. and" should read --position IV., and--

Column 3, line 43, the phrase "time. and" should read --time, and--

Column 3, line 62, the phrase "$\omega$ = angular velocity" should read -- $\dot{\omega}$ = angular velocity--

Column 3, line 63, the phrase "acceleration' With the incorporation of the initial" should appear --acceleration With the incorporation of the initial--

Column 4, line 12, the phrase "rotor 1 to 45°" should read --rotor 1 by 45°--

Column 5, line 8, the phrase "quasi.impulsive" should read --quasi-impulsive--

UNITED STATES PATENT AND TRADEMARK OFFICE
CERTIFICATE OF CORRECTION

PATENT NO. : 4,942,775

DATED : July 24, 1990

INVENTOR(S) : Monkewitz, et al.

It is certified that error appears in the above-identified patent and that said Letters Patent is hereby corrected as shown below:

Column 5, line 16, the phrase "acceleration A$o$" should read --acceleration A$_o$--

Column 5, line 19, the phrase, "(Fig. 1)." should read --(Fig. 1),--

Column 5, line 35, the phrase "3000 J" should read --300 J--

Column 5, line 35, the phrase "4.5 kw" should read --4.5 kW--

Column 5, line 44, the phrase "i.e.." should read --i.e.,--

Column 5, line 56, the phrase "an acceleration.time" should read --an accelaration-time--

Column 5, line 67, the phrase "acceleration amoun 5 ms" should read --acceleration amounts to 5 ms--

Column 6, line 11, the phrase "described.," should read --described;--

Column 6, line 16, the phrase "including fiber.reinforced plastics" should read --including fiber-reinforced plastics--

UNITED STATES PATENT AND TRADEMARK OFFICE
CERTIFICATE OF CORRECTION

PATENT NO. : 4,942,775

DATED : July 24, 1990

INVENTOR(S) : Monkewitz, et al.

It is certified that error appears in the above-identified patent and that said Letters Patent is hereby corrected as shown below:

Column 7, line 1, the phrase "rotor said" should read --rotor, said --

Column 7, line 30, the phrase "to.impulsively" should read --to impulsively--

Signed and Sealed this

Tenth Day of November, 1992

*Attest:*

DOUGLAS B. COMER

*Attesting Officer*     *Acting Commissioner of Patents and Trademarks*